United States Patent [19]

Cosman et al.

[11] Patent Number: 5,017,415

[45] Date of Patent: May 21, 1991

[54] SELF-DISPENSING SPACED ELECTRONIC MARKERS

[75] Inventors: Armond D. Cosman, Austin; Gary H. Knippelmier, Travis; Joe T. Minarovic, Williamson, all of Tex.

[73] Assignee: Minnesota Mining and Manufacturing Company, St. Paul, Minn.

[21] Appl. No.: 409,523

[22] Filed: Sep. 18, 1989

[51] Int. Cl.⁵ .................. F16L 57/00; G01V 3/08
[52] U.S. Cl. .................. 428/77; 428/136; 428/137; 428/906; 428/99; 324/326; 324/67; 405/157
[58] Field of Search ......... 428/77, 136, 99, 906; 405/157; 324/326, 67

[56] References Cited

U.S. PATENT DOCUMENTS

| | | | |
|---|---|---|---|
| 993,516 | 5/1976 | Cosman et al. | 324/48 |
| 4,761,656 | 8/1988 | Cosman et al. | 343/719 |
| 4,767,237 | 8/1988 | Cosman et al. | 405/157 |

OTHER PUBLICATIONS

Five page brochure from SENTRY-LINE-copyright notice date of 12/1985.

*Primary Examiner*—Alexander S. Thomas
*Attorney, Agent, or Firm*—Gary L. Griswold; Walter N. Kirn; Jack V. Musgrove

[57] ABSTRACT

A marker tape for location of a buried conduit, having a plurality of electronic markers spaced thereon at predetermined intervals. The distance between the markers encodes information about the buried conduit. The tape may be a nonconductive ribbon or cord, and the markers are preferably passive circuits tuned to a specific frequency. The tape ribbon embodiment may include slots therein for receiving the markers. The markers may be oriented in a predetermined pattern to encode additional information.

10 Claims, 2 Drawing Sheets

SELF-DISPENSING SPACED ELECTRONIC MARKERS

BACKGROUND OF THE INVENTION

1. Field of the Invention

The present invention generally relates to devices used to electronically mark and locate buried objects, and more particularly to a nonconductive tape or cord for dispensing a plurality of passive electronic markers at predetermined intervals adjacent to an underground utility.

2. Description of the Prior Art

Buried conduits are employed for supplying a wide variety of utilities, including pipelines for gas, water and sewage, and cables for telephone, power and television. It often becomes necessary to locate defective or damaged cables, pipes, etc., in order to repair or replace them. Conversely, it is important to know with as much accuracy as possible the approximate vicinity of such items in order to avoid disturbing them when digging or excavating for other purposes. Aboveground marking devices may be installed immediately after the conduit is buried, but they are often lost, stolen, or destroyed after a short period of use.

In the past, three different concepts have been used to indicate the presence of buried conduits, namely, warning tapes, trace wires, and electronic marker systems. A warning tape is simply a band of plastic which is placed above the conduit before burial. These tapes are used to alert the excavation team of the presence of the conduit before any damage thereto might occur. As the backhoe or other mechanical digger excavates the site, it will hopefully uproot a portion of the warning tape prior to contact with the conduit. The primary disadvantage of warning tapes is that they cannot be detected by any surface instrumentation.

A single trace wire is sometimes buried with a utility line. The trace wire is used as a conductor for an AC signal which radiates an electromagnetic field above ground. The electromagnetic field may be detected with an appropriate receiver, and the underground path of the line thereby determined. Although the conduit itself may act as a conductor (i.e., when steel pipe is used), most conduits are non-conductive and therefore require a trace wire. There are three significant disadvantages in the use of a trace wire. First of all, it is necessary to provide above ground access to the trace wire in order to couple the AC signal thereto. Secondly, if a break occurs in the wire (due to excavation, or natural causes such as corrosion, earth movement or burrowing mammals), then the wire becomes useless. Finally, the trace wire is too thin to imprint a warning message thereon, precluding any visual warning. Additionally, a receiver cannot distinguish the trace wire from any other conductor in the vicinity.

Electronic marker systems for locating buried objects are known in the art, and generally consists of two types, namely, active and passive markers. Active markers require the use of a power supply which amplifies a signal source (usually an AC signal). The signal is radiated by the underground marker and detected by a receiver unit above ground. Passive markers, in contrast, have no power supply, but rather operate in a resonant mode, responsive to a transmitted electromagnetic field.

A passive marker is basically a wire coil and capacitor surrounded in a protective envelope, which is then buried adjacent to the cable, pipe, or other object to be located. The marker is self-contained, with no external, accessible connections. Minnesota Mining & Manufacturing Co. (assignee of the present invention, and referred to hereinafter as "3M") markets several kinds of passive markers for different applications as part of its ScotchMark Electronic Marker System ("ScotchMark" is a registered trademark of 3M). See also U.S. Pat. No. 4,761,656 issued to Cosman et al. on Aug. 2, 1988.

Passive markers are activated by radiating a signal into the ground in the area where the marker is expected to be found. The signal is emitted via an inductive coil held close to the surface. When the coil is directly over, or near, the passive marker (which is itself an inductive coil), the marker accepts energy within its bandpass and stores it, reaching a sustained amplitude during the transmission cycle. When the transmission cycle ends, the marker re-emits the signal with an exponentially decaying amplitude. A second coil within the transceiver unit acts as a receiving antenna which detects the re-radiated signal, alerting the locating technician with an audible tone or other indicator means.

Warning tapes, as well as passive electronic markers, are usually color-coded according to the particular type of utility line they mark. Specifically, gas line markers are yellow; telephone cable markers are orange; waste water tunnel markers are green; water pipe markers are blue; and power supply markers are red. Similarly, the passive marker is "coded" by tuning the coil for a specific resonant frequency. Five distinct frequencies have been designated: 83.0 kHz for gas; 101.4 kHz for telephone; 121.6 kHz for sewage; 145.7 kHz for water; and 169.8 kHz for power. In this manner, a locating technician searching for, say, a gas line, cannot accidentally activate a telephone marker since his transmitter will only be sending out an 83 kHz signal, which is not within the bandwidth for a telephone marker tuned for 101.4 kHz. Of course, these frequencies have been designated by convention, and are not meant to be restrictive.

One device which incorporates all three of the above concepts is disclosed in U.S. Pat. No. 4,767,237 issued to Cosman et al. on Aug. 30, 1988, and probably represents the closest prior art to the subject invention. One embodiment described in that patent consists of a warning tape which has integral trace wires. The specification also discusses attachment of passive markers on the tape at specific locations, e.g., at a T-joint or cable termination. This device still suffers from the same crucial drawbacks as trace wires, viz., the trace wire/tape must have an access point above ground and, if the wire/tape is severed, it becomes entirely useless. It would, therefore, be desirable and advantageous to devise a marker tape system that is useable without such an access point, and which still functions in spite of any break in the tape.

Accordingly, the primary object of the present invention is to provide a device for electronically marking buried conduits.

Another object of the invention is to provide such a device which does not require an above ground access point.

Still another object of the invention is to provide a marker system which may be buried proximate the conduit along its entire length, but which will remain operative even if severed.

Yet another object of the invention is to provide a marker system which identifies the buried conduit by means of successive passive markers which together form a unique code for that conduit.

SUMMARY OF THE INVENTION

The foregoing objects are achieved in a nonconductive tether comprising a marker tape or cord having a plurality of passive markers attached thereto, the markers being spaced at predetermined intervals. The spacing of the markers is indicative of the particular conduit above which the tape lies. The markers may optionally be oriented to provide a unique pattern of null and peak readings, further encoding information about the buried conduit. Coding may easily be customized by the provision of a tape having multiple slots therein for receiving the markers.

BRIEF DESCRIPTION OF THE DRAWINGS

The novel features of the invention are set forth in the appended claims. The invention itself, however, will best be understood by reference to the accompanying drawings, wherein:

DESCRIPTION OF THE PREFERRED EMBODIMENT

Figure 1:
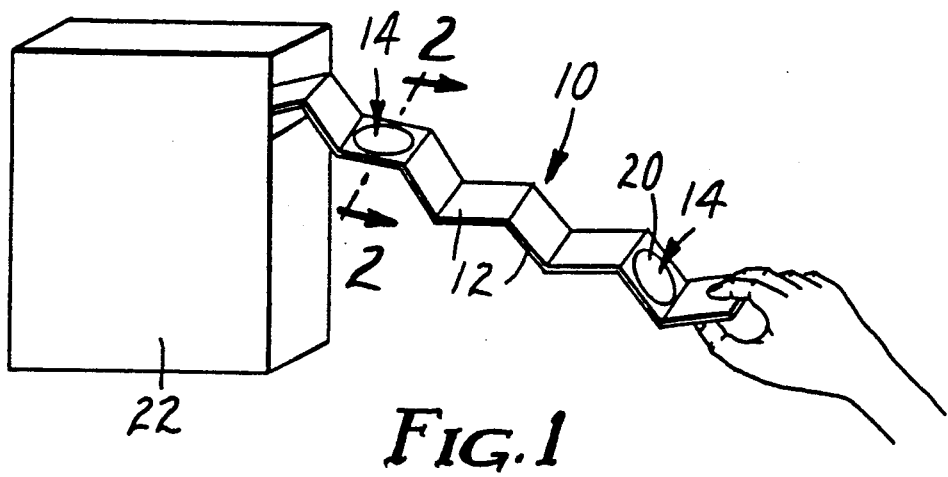
FIG. 1 is a perspective view of the Z-folded tape embodiment of the present invention.

With reference now to the figures, and in particular with reference to FIG. 1, there is depicted a self-dispensing marker tape 10. Marker tape 10 is generally comprised of a tether in the form of a length of tape ribbon 12 and a plurality of spaced, passive markers 14. Tape ribbon 12 is constructed from any durable, nonconductive material, preferably a lightweight polymer such as polyvinyl chloride, polyethylene or polyester. Tape ribbon 12 may optionally be color-coded in accordance with the conventions set forth above in the Description of the Prior Art. Moreover, tape 10 may be printed with information related to the utility line which is to be marked in case it is unearthed during excavation.

Figure 2:
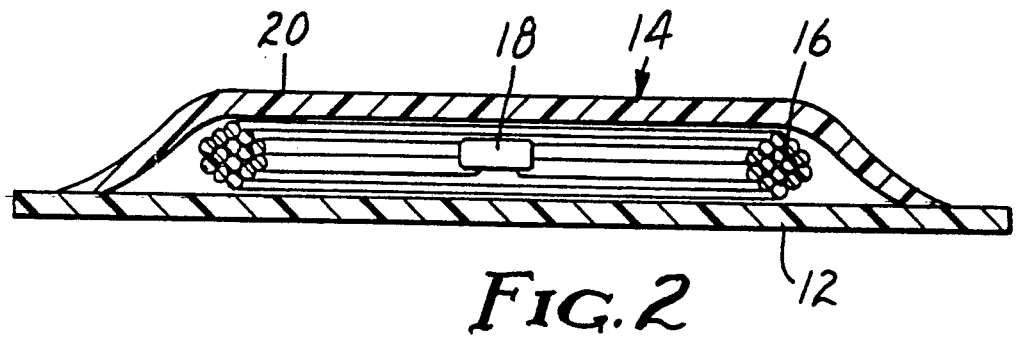
FIG. 2 is a cross-section of one of the passive markers taken along lines 2—2 of FIG. 1.

Referring now to FIG. 2, passive markers 12 are known in the art and are typically comprised of a coil of wire 16 with a capacitor 18 connected between the ends of coil 16. Coil 16 is essentially an inductor, so marker 12 is a tuned circuit having a resonant frequency $f = 1/(2\pi\sqrt{LC})$ where L is the inductance of coil 16 and C is the capacitance of capacitor 18. The inductance is dependent upon the diameter of the coil and the number of windings. For a given tape 10, markers 12 should all be tuned to the same resonant frequency, preferably in accordance with the conventions set forth above in the Description of the Prior Art, and consistent with any color-coding embedded in tape ribbon 12.

Passive markers 14 may be attached to tape ribbon 12 by any convenient method. In the preferred embodiment, markers 14 are attached to tape ribbon 12 by the use of a protective envelope 20 constructed of the same material as tape ribbon 12, which is ultrasonically welded to tape ribbon 12. Other methods of attachment, such as the use of adhesives, rivets, snap-in receptacles, etc. are also acceptable. Protective envelope 20 must be nonmetallic to allow the electromagnetic signal from marker 14 to penetrate therethrough and be detected by the marker locating device.

The width of marker tape 10 may vary, and is primarily dependent upon the outer diameter of passive markers 14, as well as the width of the conduit excavation path. It is anticipated that a marker having a diameter of about five inches (12.7 cm) would be satisfactory for most applications, although this is not meant to restrict the scope of the invention. The length of marker tape 10 is indefinite, and is limited only by the means for storing, shipping and dispensing the same. In this regard, due to the planar nature of passive markers 14, it is less efficient to provide marker tape 10 on a reel or spool. Instead, marker tape 10 is preferably stored in a Z-fold fashion, as depicted in FIG. 1. In this manner, marker tape 10 may be conveniently transported in and dispensed from a rectangular container 22.

Figure 3:
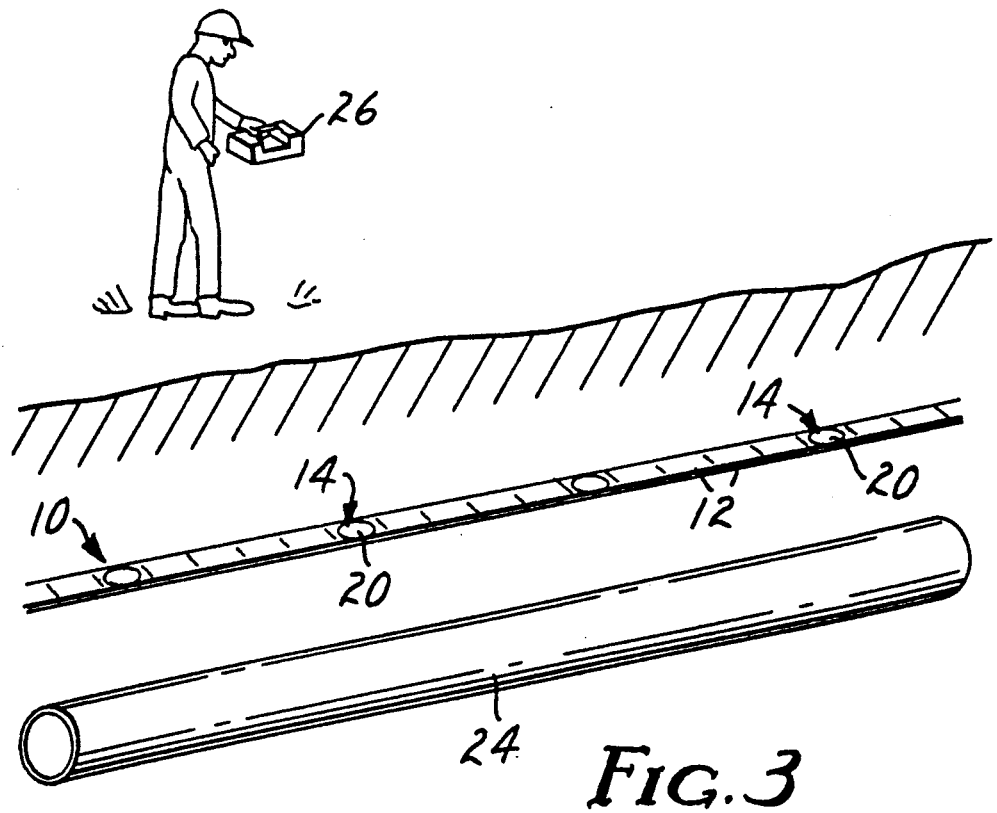
FIG. 3 is a perspective view depicting location of a buried conduit above which lies the tape embodiment of the present invention.

As can best be seen in FIG. 3, marker tape 10 is typically buried above the conduit 24. Marker tape 10 may be situated by positioning it in the ditch above conduit 24 prior to burial, by plowing it into the ground, or by feeding it through an existing tunnel previously bored or placed in the ground. Marker tape 10 may then be detected by the use of an appropriate locating device 26, such as 3M's EMS II Marker Locator ("EMS" is a registered trademark of 3M). See also, Canadian Patent No. 993,516 issued to Cosman et al. Flags or stakes may be placed at the surface corresponding to the location of each marker 14.

Passive markers 14 are spaced along tape ribbon 12 at regular intervals. The distance between markers 14 is predetermined, and "encodes" further information about the conduit being marked. The spacing may, for example, identify the type of utility line (e.g, gas, water, etc.), but inasmuch as this information is already encoded in the resonant frequency of passive markers 14, it is anticipated that other information might be encoded, principally, the depth of the pipe. Alternatively, the spacing might encode such information as the pipe diameter, the direction to a shutoff valve, the date the pipe was buried, a contractor identification number, or simply an index number which may be matched with company records to insure that the conduit so located is indeed the one which was being searched for. Of course, the provision of successive markers also demarcates the underground path of the conduit, regardless of the spacing of markers 14.

It should be noted that "active" markers (spaced at predetermined intervals) can be utilized with the present invention, but passive markers are preferable since they require no power supply. Similarly, tape ribbon 12 may include trace wires which would activate passive markers and simplify the requirements of locator device 26. Nevertheless, a nonconductive tape ribbon is preferable since it does not require an above ground access point, and will function in spite of any break in the tape.

Figure 4:
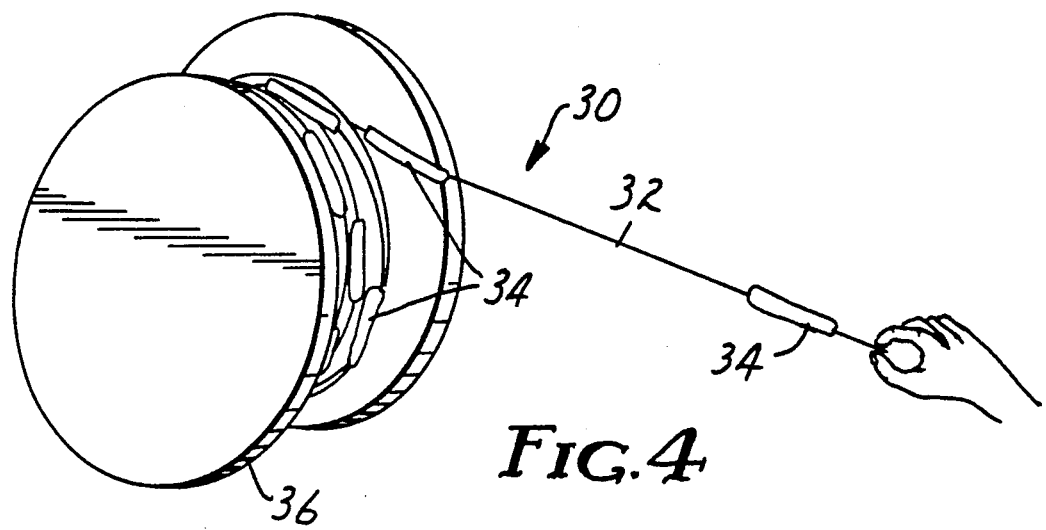
FIG. 4 is a perspective view of the spooled cord embodiment of the present invention.

With further reference to FIG. 4, the marker cord embodiment 30 of the present invention is explained. Marker cord 30 is analogous to marker tape 10 in that it is comprised of only two basic elements, a cord line 32 and passive markers 34. Passive markers 34 function in essentially the same manner as markers 14, but they are cylindrical, rather than circular, similar to 3M's Scotch-Mark Near-Surface Markers ("ScotchMark" is a registered trademark of 3M). The axes of markers 34 are aligned with cord line 32, which is preferably nonconductive and may be formed from any durable material, including polymers such as polypropylene. Due to the linear nature of marker cord 30, it may conveniently be spooled onto a reel 36 for storage and dispensing.

It will be understood that the subject invention is not limited by the specific use of tape ribbon 12 or cord line 32, but rather contemplates the use of any tether which allows passive markers to be dispensed at predetermined spacings. Consequently, for purposes of the claims, the phrase "tether means" denotes tape ribbon 12, cord line 32, or any other equivalent article. Nevertheless, a flat tape is clearly preferable for flat, circular markers, and a cord is preferably for cylindrical markers. As those skilled in the art will appreciate, the markers are thereby oriented so as to optimize the peak and null readings at the surface. In this regard, it is helpful to know in advance the type of passive marker being used (i.e., the alignment of the marker axes) in order to orient the locator's induction coil properly so as to detect the peaks and nulls from the passive markers.

Figure 5A:
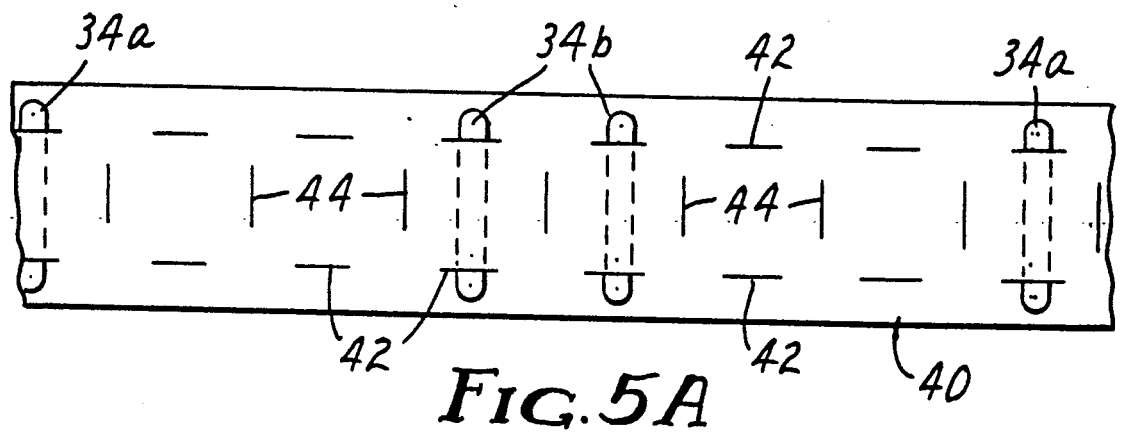
FIGS. 5A and 5B are top plan views of the slotted tape embodiment of the present invention illustrating custom orientation of the passive markers.
Figure 5B:
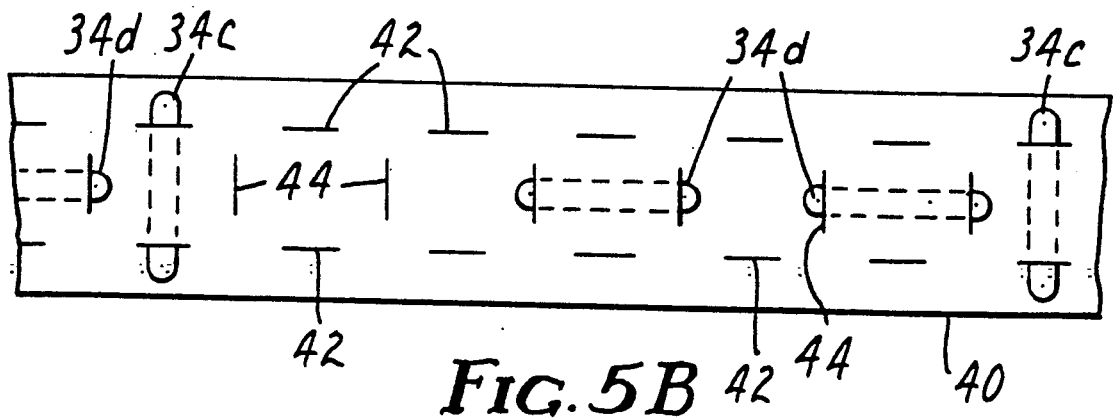

Referring now to FIGS. 5A and 5B, further methods may be employed in the positioning of the passive markers in order to encode even more information. FIG. 5A illustrates the placement of cylindrical markers 34 in an irregular fashion, e.g., having a single marker 34a followed by a marker pair 34b, which is then followed by another single marker 34a, and so on. The marker sequence forms a pattern which may, as mentioned above, encode various details of the marked conduit. It will, therefore, be understood that the phrase "predetermined intervals" is not limited to equal spacings between markers. The number of possible codes thereby created is theoretically infinite, and provides a clever method for differentiation of several conduits buried in the same vicinity.

The inventors have also found that the orientation of the passive markers may be used to encode information. As shown in FIG. 5A, some markers 34c may be longitudinally aligned with the tape, while other markers 34d are aligned perpendicular thereto. As noted above, a marker locator device will pick up peak signals only from markers whose axes are aligned with the axis of the locator's induction coil. Therefore, the locator must be rotated periodically when checking this type of marker tape, or two separate, orthogonal induction coils must be present in the locator. As with the patterns of FIG. 5A, the number of possible combinations of marker orientations is theoretically infinite.

A further refinement of the invention utilizes passive markers which have different resonant frequencies. As alluded to above, the resonant frequency of all of the markers 14 on a given marker tape 10 may be the same, viz., the accepted frequency for the particular kind of utility being marked. The frequencies of the markers may, however, be advantageously used to encode information about the conduit. For example, a tape may be constructed with markers of two different frequencies, $f_1$ and $f_2$. These markers may be placed in a regular order on the tape, e.g., markers successively alternating between $f_1$ and $f_2$. More complicated encryptions are also possible. For this application, it is necessary to use a locating device (transceiver) emitting a multiple frequency signal.

FIGS. 5A and 5B also illustrate the use of a slotted ribbon 40 for carrying the passive markers. Slotted ribbon 40 may be provided with both horizontal slots 42 and vertical slots 44 to allow custom placement and orientation of the markers. Moreover, provision of slotted ribbon 40 simplifies attachment of the markers to the point that they may be affixed in the field. The user is supplied with an abundance of markers 34 and a slotted ribbon 40 having no markers thereon. As the ribbon is dispensed from its reel, or as it is positioned above the conduit, the markers may be placed in the appropriate slots.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, it is possible to encode a great deal of information by combining several of the above-described techniques, e.g., having a tape with regularly spaced markers, the markers having different orientations and different resonant frequencies. It is therefore contemplated that the appended claims will cover such modifications that fall within the true scope of the invention.

We claim:

1. An article for electronically marking a buried conduit, comprising:
   a plurality of generally cylindrical, electronic markers;
   a cord maintaining spacing of said markers at predetermined intervals; and
   means attached said markers to said cord.

2. The article of claim 1 wherein said electronic markers are passive, having a coil of wire connected in parallel with a capacitor, forming a resonant circuit.

3. The article of claim 1 wherein said plurality of electronic markers includes a set of first markers having a first resonant frequency, and a set of second markers having a second resonant frequency which is different from said first resonant frequency, said first and second markers being arranged in a predetermined order.

4. An article for electronically marking a buried conduit, comprising:
   a plurality of electronic markers having longitudinal axes;
   a tape ribbon having a plurality of slots therein receiving said markers and maintaining said markers with their respective axes oriented in a predetermined pattern; and
   means attached said markers to said tape ribbon.

5. The article of claim 4 wherein said tape ribbon further spaces said markers at predetermined intervals.

6. The article of claim 4 wherein said plurality of electronic markers includes a set of first markers having a first resonant frequency, and a set of second markers having a second resonant frequency which is different from said first resonant frequency, said first and second markers being arranged in a predetermined order.

7. An article for electronically marking a buried conduit, comprising:
   a plurality of first electronic markers each being tuned to a first resonant frequency;
   a plurality of second electronic markers each being tuned to a second resonant frequency which is different from said first resonant frequency;

tether means for securing said first and second markers in a predetermined order; and means for attaching said first and second markers to said tether means.

8. The article of claim 7 wherein said first and second markers are passive, each having a coil of wire connected in parallel with a capacitor.

9. The article of claim 7 wherein said first and second markers have longitudinal axes, said axes being oriented in a predetermined pattern.

10. The article of claim 7 wherein said tether means additionally maintains a spacing of said first and second markers at predetermined intervals.

* * * * *